United States Patent [19]
Lee et al.

[11] Patent Number: 5,886,762
[45] Date of Patent: Mar. 23, 1999

[54] LIQUID CRYSTAL DISPLAY DEVICE WITH ENHANCED RESPONSE SPEED, TRANSMITTANCE, AND APERTURE RATIO AND METHOD FOR MANUFACTURING THE SAME

[75] Inventors: Seung-Hee Lee, Ich'on; Seok-Lyul Lee, Anyang; Hyang-Yul Kim, Ich'on; Bong-Gyu Rho; Sun-Gil Kwon, both of Suwon; Hae-Sung Park, Seoul, all of Rep. of Korea

[73] Assignee: Hyundai Electronics Industries Co., Ltd., Kyoungki-do, Rep. of Korea

[21] Appl. No.: 974,012

[22] Filed: Nov. 19, 1997

[30] Foreign Application Priority Data

Nov. 29, 1996 [KR] Rep. of Korea .................. 96-59510

[51] Int. Cl.⁶ .................................................. G02F 1/1343
[52] U.S. Cl. ........................ 349/141; 349/139; 349/145; 349/146
[58] Field of Search .................................... 349/139, 141, 349/145, 146

[56] References Cited

U.S. PATENT DOCUMENTS

| 5,233,449 | 8/1993 | Shioji et al. ........................... 349/141 |
| 5,414,545 | 5/1995 | Lee ............................................ 359/53 |
| 5,426,313 | 6/1995 | Sukegawa et al. .................... 257/59 |
| 5,434,690 | 7/1995 | Hisatake et al. ....................... 359/87 |
| 5,598,285 | 1/1997 | Kondo et al. ........................... 349/141 |
| 5,600,464 | 2/1997 | Ohe et al. ................................ 349/123 |
| 5,694,188 | 12/1997 | Sano et al. ............................. 349/139 |
| 5,745,207 | 4/1998 | Asada et al. ........................... 349/145 |
| 5,760,856 | 6/1998 | Yanagawa et al. .................... 349/42 |
| 5,760,857 | 6/1998 | Yanagawa et al. .................... 349/141 |

FOREIGN PATENT DOCUMENTS

07191336  7/1995  Japan .

Primary Examiner—William L. Sikes
Assistant Examiner—Tarifur R. Chowdhury
Attorney, Agent, or Firm—Ware, Fressola, Van Der Sluys & Adolphson LLP

[57] ABSTRACT

Disclosed is a liquid crystal display device comprising gate line; a data line intersecting with the gate line over the gate line; a first electrode of transparent metal material comprising: a first portion elongated over the data line along the first direction and perpendicularly intersecting with the data line; a second portion comprising a plurality of branches each elongated along the second direction starting from the first portion of the first electrode toward the gate line; and a third portion separated by a predetermined distance along the second direction with the gate line, and elongated along the first direction starting from the longest branch to a space formed between the shortest branch and its closest branch; a second electrode of transparent metal material, formed on the same plane as the first electrode, the second electrode having a first portion corresponding to the second portion of the first electrode and a second portion corresponding to the third or first portion of the first electrode.

33 Claims, 5 Drawing Sheets

Figure 1:
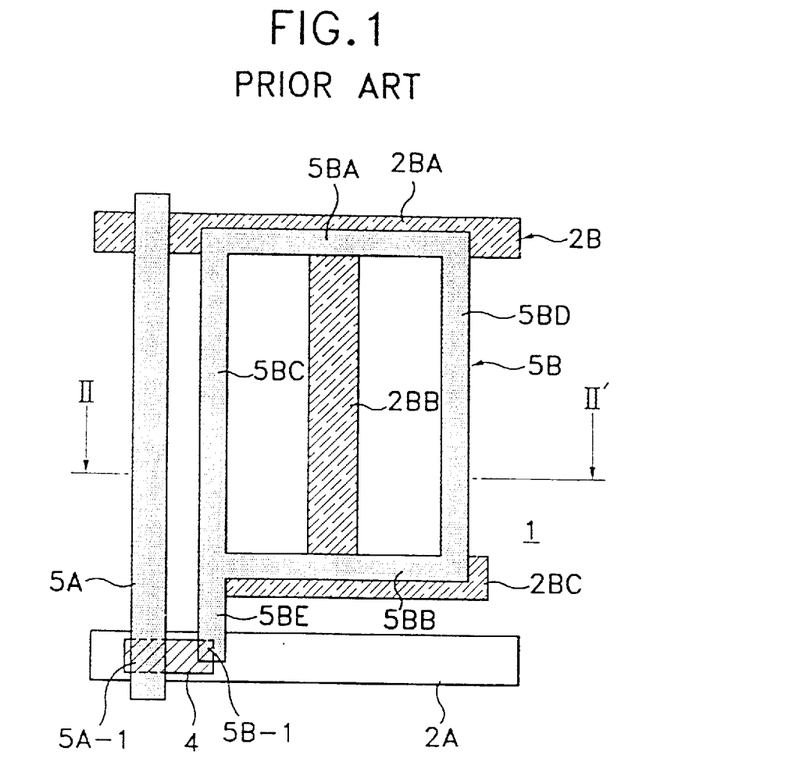
FIG. 1 is a planar view for an electrode structure formed on a lower substrate of a conventional IPS mode liquid crystal display.

FIG.7 ded perpendicularly to the first and second portion 2BA, 2BC, formed between a middle part of the first portion 2BA and a middle part of the second portion 2BC. The pixel electrode

LIQUID CRYSTAL DISPLAY DEVICE WITH ENHANCED RESPONSE SPEED, TRANSMITTANCE, AND APERTURE RATIO AND METHOD FOR MANUFACTURING THE SAME

BACKGROUND OF THE INVENTION

1. Field of the Invention

The present invention relates to a liquid crystal display with enhanced response speed, transmittance, and aperture ratio and a method for manufacturing the same.

2. Description of the Related Art

Liquid crystal displays are widely used in television and graphic displays. Especially, since active matrix liquid crystal displays has high response speed and are compatible in display devices with many pixels, they greatly contribute to realizing high definition and larger sized displays.

These liquid crystal display devices comprise a pair of transparent glass substrates, thin film transistors and pixel electrodes formed on one of the glass substrates, and color filters, and counter electrodes formed on the other glass substrate. Liquid crystal material is injected and sealed inside the space between two glass substrates.

Twisted nematic mode liquid crystals are widely in use recently because of their superior optical characteristics. The liquid crystal molecules in the twisted nematic mode are parallel to the upper and lower glass substrates when no voltage is introduced to the same. Also, the molecules are continuously arranged so that a twisted angle between the upper most molecules and lower most molecules has 90°. When voltage is introduced to the glass substrates facing each other, an electric field perpendicular to the glass substrates is formed and the liquid crystal molecules are arranged along the electric field. However, since the liquid crystal molecules of the twisted nematic(hereinafter abbreviated as TN) liquid crystal displays can be arranged only in one direction, a viewing angle is narrow.

Various technologies to enhance the viewing angle have been suggested. One of them is an IPS(In-Plane Switching) mode liquid crystal display. In the IPS mode liquid crystal display, counter electrodes usually formed on the upper substrate are formed on the lower glass substrate where pixel electrodes are formed. Hence, an electric field parallel to the substrates is formed between the pixel electrode and the counter electrode.

Figure 2:
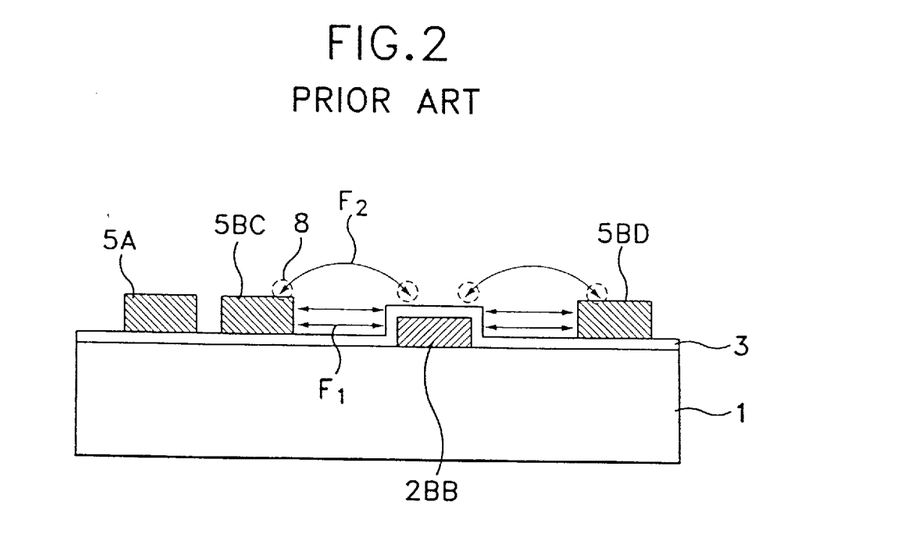
FIG. 2 is a sectional view along the II–II' line of FIG. 1.

Referring to FIG. 1 and FIG. 2, the IPS mode liquid crystal display device comprises a gate line 2A in a column direction formed on a surface of a lower substrate 1 for scan image information to the upper part of the lower substrate; a counter electrode 2B on the same plane where the gate line 2A is, separated from the gate Line 2A by a predetermined distance; a gate insulation film 3 formed on a surface of the resultant structure where the gate line 2A and the counter electrode 2B are formed; a data line 5A which defines a pixel domain together with the gate line 2A, formed in the column direction and perpendicular to the gate line 2A that is separated by the gate insulation film 3; and a pixel electrode 5B lying on the same plane as the data line 5A over the counter electrode 2B, overlapping with some parts of the counter electrode 2B. The counter electrode 2B comprises a first portion 2BA and a second portion 2BC which are parallel to the gate line 2A; a third portion 2BB arranged perpendicularly to the first and second portion 2BA, 2BC, formed between a middle part of the first portion 2BA and a middle part of the second portion 2BC. The pixel electrode 5B has a first portion 5BA and a second portion 5BB which both have identical length and parallel to the gate line 2A; third and fourth portions 5BC, 5BD, both parallel to the data line 5A, respectively connected to the end parts of the first portion 5BA and the second portion 5BB; and a fifth portion 5BE which is protruded from the third portion 5BC, parallel to the data line 2A.

The first and second portions 2BA, 2BC of the counter electrode 2A, which overlaps with the pixel electrode 5B, are employed as an electrode of a capacitor for maintaining the liquid crystal molecules in a certain form for a predetermined period. One end of the fifth portion 5BE of the pixel electrode 5A where the pixel electrode 5B and the gate line 2A intersect, is employed as a drain for a thin film transistor. Furthermore, the semiconductor layer 4 formed at a predetermined part of the top surface of the gate insulation film 3 serves as a channel for a thin film transistor. One end of the data line 5A intersecting with the semiconductor layer 4 formed on the gate line 2A is employed as a source for a thin film transistor.

The above described gate line 2A and the counter electrode 2B is made of one selected from a group consisting of aluminum, titanium, tantalum, and chrome and combination thereof. The gate insulation film 3 is made by oxidizing one of the above metals or forming double insulation layer. The data line and the pixel electrode are formed by depositing one of the above mentioned metals and patterning the same.

As it is shown in the sectional view of FIG. 2, an electric field F1 parallel to the glass substrate is formed between the pixel electrode 5B and the counter electrode 2B. However, since the pixel electrode and the counter electrode are rectangular form, the edge effect causes a parabolic electric field F2 at the edges of these electrodes. The liquid crystal molecules are arranged along the electric field. Hence the longer axis of the molecules along the electric field F1 is parallel to the glass substrates. However, since the longer axis of the liquid crystal molecules has a slanting angle to the glass substrates due to the electric field F2, the liquid crystal molecules situated at the top surface of the electrodes 5BC, 2BC, 5BB which have longer axis perpendicular to the glass substrates, do not react to the introduced voltage. Thus, the response speed and the transmittance are inherently low.

Figure 3:
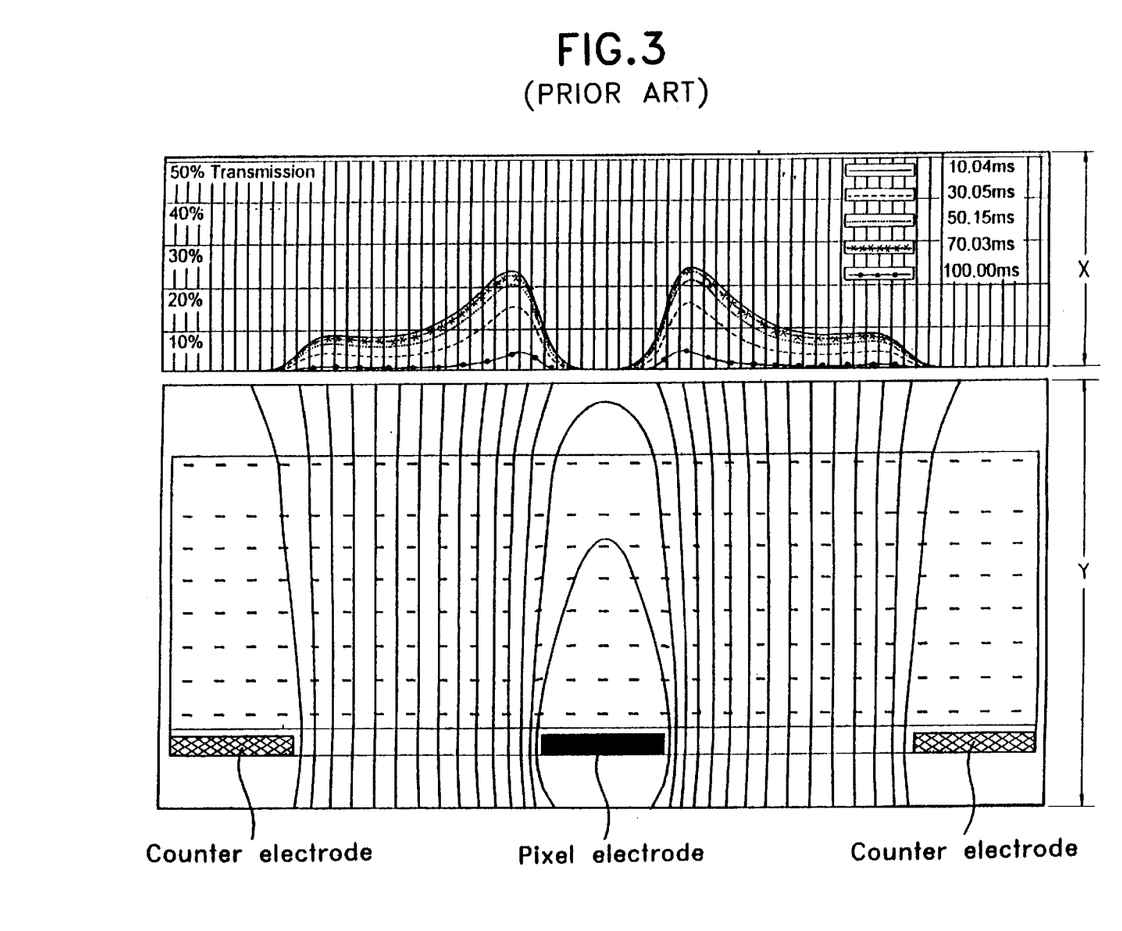
FIG. 3 is a view illustrating the transmittance of a conventional liquid crystal display when voltage is introduced to the same.

The transmittance of a conventional liquid crystal display where the distance between the pixel electrode and the counter electrode is 210 μm, the width of the pixel electrode or the counter electrode is 20 μm, the liquid crystal molecules have a slanting angle of 22° to the horizontal axis, and the introduced voltage to the pixel electrode is 8 V, is shown in FIG. 3, for example of the above description. In FIG. 3, the X stands for transmittance to the voltage introduced to the lower substrate, and the Y stands for a height of the liquid crystal layer from the lower substrate with the pixel electrode and the counter electrode. The transmittance after 100 ms from introducing voltage is about 38% and that before 100 ms is 30% or less.

Also, as the pixel electrode and the counter electrode are made of non-transparent metal, the transmittance is close to 0% in these areas. Hence, the aperture ratio of the liquid crystal display is reduced.

SUMMARY OF THE INVENTION

The object of the present invention is to provide liquid crystal displays with increased response speed with respect to an introduced voltage and with increased transmittance and a method for manufacturing the same.

Another object of the present invention is to provide liquid crystal displays with increased aperture ratio and a method for manufacturing the same.

According to a view of the present invention, a liquid crystal display device comprises a gate line elongated along a first direction, a data line elongated along a second direction substantially perpendicular to the first direction, and intersecting with the gate line over the gate line, a first electrode of transparent metal material formed over the data line and a second electrode of transparent metal material, formed on the same plane as the first electrode. The first electrode comprises a first portion elongated over the data line along the first direction and perpendicularly intersecting with the data line, and a second portion comprising a plurality of branches each elongated along the second direction starting from the first portion of the first electrode toward the gate line. One of two outer most branches is longer than branches between the two outer most branches, and the other outer most branch is shorter than the two outer most branches. Also, the first electrode further has a third portion separated by a predetermined distance along the second direction with the gate line, and elongated along the first direction starting from the longest branch to a space formed between the shortest branch and its closest branch. The second electrode comprises a first portion elongated along the first direction between the third portion of the first electrode and the end parts of the branches of the second portion of the first electrode from a portion corresponding to one end of the third portion of the first electrode to a portion corresponding to the other end of the third portion of the first electrode, and a second portion comprising a plurality of branches each separated from the plurality of branches each of the first electrode by a predetermined distance. The second portion of the second electrode is elongated along the second direction starting from the first portion of the second electrode to the space between the branches of the second portion of the first electrode.

The ratio between the width of the branches of the first electrode and those of the second electrode is preferred to be 0.1 to 10. Also, the width of the branches of the first and second electrodes are preferred to be in the range of 4 to 8 $\mu$m. The ratio between the width of the branches of the second electrode or first electrode and the distance from their respective neighboring branches of the first electrode or second electrode is preferred to be 0.1 to 2. The number of branches for the second electrode is preferably 5. Also, the first and second electrodes are made of ITO. The first electrode is a counter electrode and the second is a pixel electrode or vise versa.

Also, according to another view of the present invention, a third electrode formed on the same plane as the gate line, elongated along the first direction so as to overlap with the end portion of the branches of the second electrode can further be comprised. The third electrode forms auxiliary capacitors at the overlapping portions with the branches of the second electrode. Also, the first and the third electrodes can be connected by a contact.

Furthermore, according to another still view of the present invention, the liquid crystal display further comprises a thin film transistor formed at the space between the shortest branch of the first electrode and the gate line. The thin film transistor described above is connected with the branch of the second electrode which is adjacent to the data line, gate line, and shortest branch of the counter electrode.

Also, according to still another view of the present invention, the liquid crystal display further comprises a substrate equipped with a black matrix facing the domain defined by the data line and the gate line, the domain excluding the branches of the first electrode, the third portion of first electrode, and the space defined by the third electrode and the branches of the second electrode.

In the above description, the first and third electrodes may be counter electrodes and the second electrode may be a pixel electrode.

According to another view of the present invention, a liquid crystal display comprises a substrate, a gate line formed on the top surface of the substrate, a first counter electrode formed on the same plane as the gate line, separated along the second direction from the first portion of the gate line by a predetermined distance, elongated to the first direction, a gate insulation film formed on the resulting structure on which the gate line and the first counter electrode are formed, a semiconductor layer formed on top of the gate insulation layer beneath which the second portion of the gate line is formed, and a data line. The gate line comprises a first portion elongated along a first direction, and a second portion protracted from the first portion by a predetermined length along a second direction which is perpendicular to the first direction. The data line comprises a first portion intersecting with the first portion of the gate line under the gate insulation film, and a second portion protracting from the first portion of the data line and overlapping with a predetermined part of one end of said semiconductor layer. Further the liquid crystal display comprises a drain region where one end of the drain region overlaps with a predetermined part of the other end of the semiconductor layer, a protective layer formed on top of the resulting structure on which said data line and the drain region are formed, a second counter electrode of a transparent metal material, formed on top of the resulting structure on the protective layer is formed, and a pixel electrode of a transparent metal material, formed on the same plane as the second counter electrode. The protective layer is equipped with contact holes that expose a predetermined part of the first counter electrode and a predetermined part of the drain region. The second counter electrode comprises a first portion elongated along the first direction over the data line and perpendicularly intersecting with the first portion of said data line, and a second portion comprising a plurality of branches elongated along the second direction from the first portion of the second counter electrode toward the gate line. One of the outer most branches is longer than the branches between the two outer most branches, and the other outer most branch is shorter than the branches between the two outer most branches. Also, the second counter electrode has a third portion separated by a predetermined distance along the second direction with the gate line, and elongated along the first direction starting from the longest branch to the space formed between the shortest branch and its closest branch. The pixel electrode comprises a first portion elongated along the first direction between the third portion of the second counter electrode and the end part of the branches of the second portion of the second counter electrode from a portion corresponding to one end of the third portion of the second counter to a portion corresponding to the other end of the third portion of the second counter electrode, and a second portion comprising a plurality of branches each separated with the plurality of branches each of the second counter electrode by a predetermined distance. The branches each of second portion of the pixel electrode is elongated along the second direction starting from the first portion of the pixel electrode to the space between said branches of the second portion of the second counter electrode.

According to the present invention, in a method manufacturing a liquid crystal display having a gate line elongated along a first direction and a data line elongated along a second direction practically perpendicular to the first direction and intersecting with the gate line, the method comprises the step of simultaneously forming a first electrode and a second electrode over the data line, the first electrode being transparent metal material and the second electrode being transparent metal material and formed on same plane as the first electrode. The first electrode comprises a first portion elongated over the data line along the first direction and perpendicularly intersecting with the data line, and a second portion comprising a plurality of branches each elongated along the second direction starting from the first portion of the first electrode toward the gate line. One of the two outer most branches is longer than branches between the two outer most branches, and the other outer most branch is shorter than the branches between the two outermost branches. The first electrode further comprises a third portion separated by a predetermined distance along the second direction with the gate line, and elongated along the first direction starting from the longest branch to the space formed between the shortest branch and its closet branch. The second electrode comprises a first portion elongated along the first direction between the third portion of the first electrode and the end part of the branches of the second portion of the first electrode from a portion corresponding to one end of the third portion of the first electrode to a portion corresponding to the other end of the third portion of the first electrode, and a second portion comprising a plurality of branches each separated with the plurality of branches each of the first electrode by a predetermined distance. The second portion of the second electrode is elongated along the second direction starting from the first portion of the second electrode to the space between the branches of the second portion of the first electrode.

The ratio between the width of the branches of the first electrode and those of the second electrode is preferred to be 0.1 to 10. Also, the width of the branches of the first and second electrodes are preferred to be in the range of 4 to 8 $\mu$m. The ratio between the width of the branches of the second electrode or first electrode and the distance from their respective neighboring branches of the first electrode or second electrode is preferred to be 0.1 to 2. The number of branches for the second electrode is preferably 5. Also, the first and second electrodes are made of ITO. The first electrode is a counter electrode and the second is a pixel electrode or vise versa.

In another embodiment of the present invention, a step of forming a third electrode on the same plane as the gate line elongated along the first direction so as to overlap with end parts of the branches of the second electrode can further be comprised. Also, steps of forming an insulation layer and a protective layer on top of the resulting structure comprising the third electrode; and forming contact holes by etching a predetermined part of the insulation layer and the protective layer can further be comprised so as to connect the first electrode and the third electrode. In this process, the first and the third electrodes become a first and second counter electrodes respectively, and the second electrode becomes a pixel electrode.

Another method of manufacturing a liquid crystal displays according to the present invention comprises the steps of providing a substrate, forming simultaneously both a gate line and a first counter electrode on top surface of the substrate, forming a gate insulation film on the resulting structure on which the gate line and the first counter electrode are formed, forming a semiconductor layer on top of a predetermined part of the gale insulation film where the second portion of the gate line is formed, and forming simultaneously a data line and a drain region. The gate line comprises a first portion elongated along a first direction of the gate line, and a second portion protracted from the first portion by a predetermined length along a second direction which is perpendicular to the first direction. The first counter electrode is separated along the second direction from the first portion of the gate line by a predetermined distance and elongated to the first direction. The data line comprises a first portion intersecting with the first portion of the gate line by way of the gate insulation film, and a second portion protracting from the first portion of the data line and overlapping with a predetermined part of one end of the semiconductor layer. One end of the second electrode overlaps with a predetermined part of the other end of the semiconductor layer. The method further comprises the steps of forming a protective film on the resulting structure on which the data line and drain region are formed, etching the protective film formed on the drain region, and the protective film and the gate insulation layer formed on the first counter electrode to expose a predetermined part of the drain region and a predetermined portion of the first counter electrode, and forming simultaneously a second counter electrode and a pixel electrode. The second counter electrode of transparent metal material comprises a first portion elongated on the data line along the first direction and perpendicularly intersecting with the data line, and a second portion comprising a plurality of branches elongated along the second direction starting from the first portion of the second counter electrode toward the gate line. One of the two outer most branches is longer than the branches in the two outer most branches, and the other outer most branch is shorter than the branches in the two outermost branches. The second counter electrode further comprises a third portion separated by a predetermined distance along the second direction with the gate line and elongated along the first direction starting from the longest branch to the space formed between the shortest branch and its closest branch. The pixel electrode of transparent metal material is formed on the same plane as the second counter electrode. The pixel electrode comprises a first portion elongated along the first direction between the third portion of the second counter electrode and the end part of the branches of the second portion of the second counter electrode from a portion corresponding to one end of the third portion of the second counter electrode to a portion corresponding to the other end of the third portion of the second counter electrode. Also the pixel electrode comprises a second portion comprising a plurality of branches each separated with the plurality of branches each of the second counter electrode by a predetermined distance. The second portion of the pixel electrode is elongated along the second direction starting from the first portion of the pixel electrode to the space between the branches of the second portion of the second counter electrode.

In this process, the second portion of the gate line, the semiconductor layer, and the second portion of the data line constitute a thin film transistor. The second counter electrode and the pixel electrode are made of ITO. Also, the data line and the drain domain are made of one selected from a group consisting of aluminum, titanium, tantalum, and chrome and combination thereof. The insulation layer is made by oxidizing the metal used in forming the data line and the drain domain.

Since the second counter electrode and the pixel electrode are made of transparent metal material and have a plurality of branches adjacent with each other, parabolic electric fields do not appear at the upper edge of the electrode pattern. Instead, electric fields parallel to the substrate where the second counter electrode and the pixel electrode are formed. Hence response speed to the introduced voltage is increased as well as transmittance and aperture ratio. Moreover, second counter electrode electrically connected with the first counter electrode formed underneath prevents delays in transmission of counter electrode signals hence increasing the response speed even more.

DETAILED DESCRIPTION OF THE INVENTION

A more detailed description of the present invention is given below with reference to the drawings.

Figure 4:
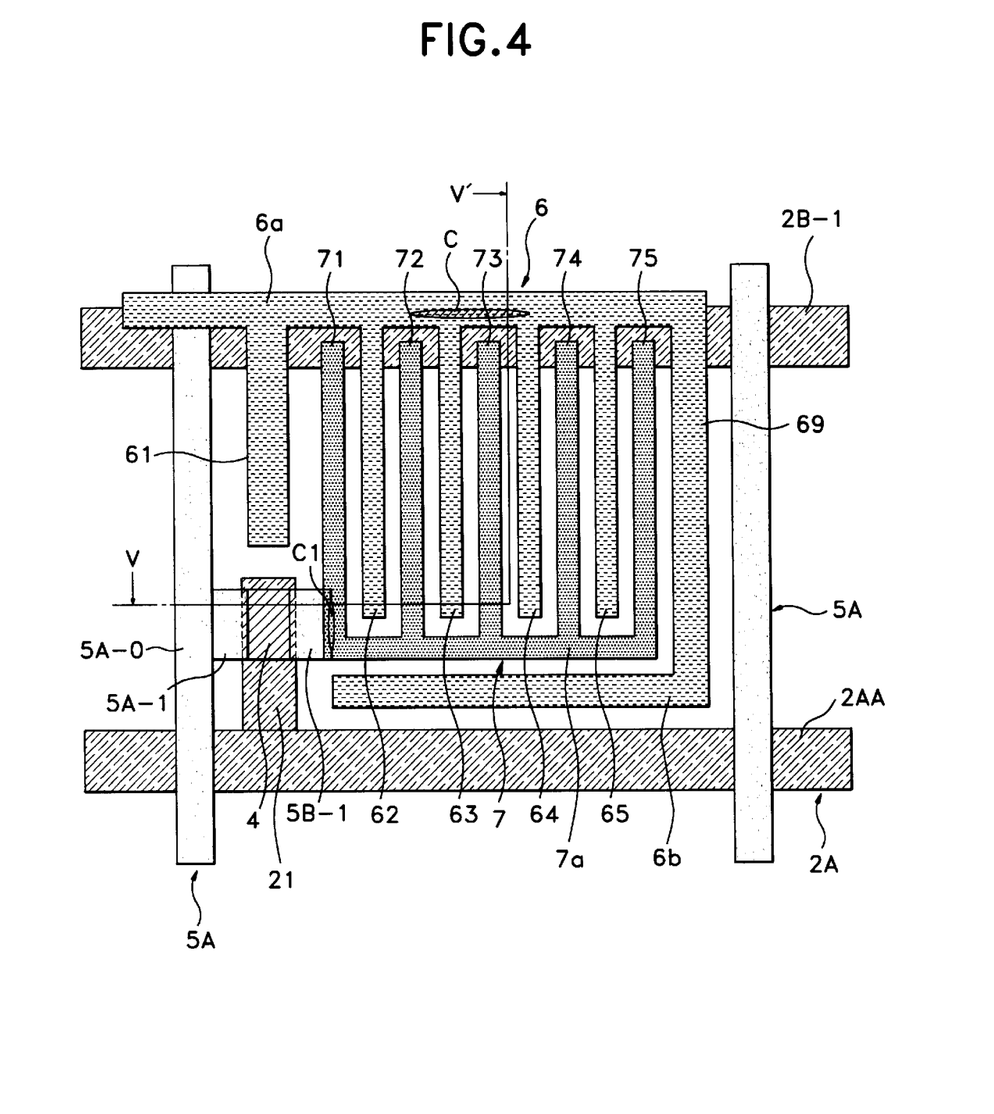
FIG. 4 is a planar view for an electrode structure formed on a lower substrate of an IPS mode liquid crystal display according to the present invention.
Figure 5:
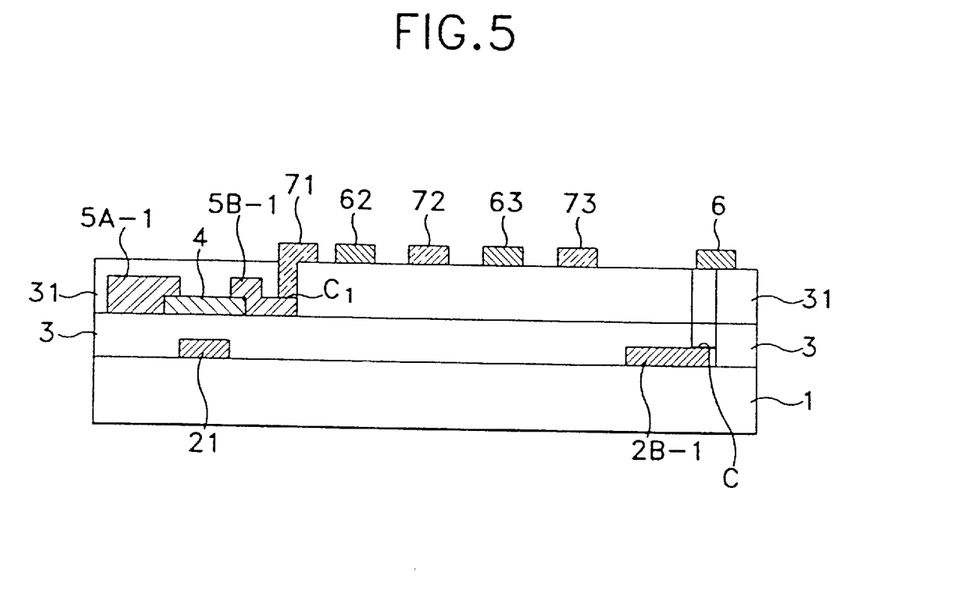
FIG. 5 is a sectional view along the V–V' line of FIG. 4.

As illustrated in FIG. 4 and FIG. 5, a gate line 2A and a first counter electrode 2B-1 are arranged on top surface of a lower substrate 1. The first counter electrode 2B-1 is arranged along a first direction. The gate line 2A comprises a first portion 2AA separated from the first counter electrode 2B-1 and elongated along the first direction; and a second portion 21 elongated towards the first counter electrode 2B-1 along a second direction perpendicular to the first direction. One end of the second portion 21 of the gate line 2A serves as a gate to a thin film transistor. A gate insulation film 3 is deposited over the resulting structure on which the first counter electrode 2B-1 and the gate line 2A are formed, to provide insulation from electrodes which will be formed in a later process. A semiconductor layer 4 is formed at a predetermined part of the gate insulation film 3. The semiconductor layer 4 is made of amorphous silicon. Also, a data electrode 5A elongated along the second direction which perpendicularly intersects with the first counter electrode 2B-1 and the gate line 2A, is formed on top surface of the gate insulation film 3. The data electrode 5A comprises a first portion 5A-0 elongated along the second direction; a second portion 5A-1 protruding from the first portion of the data electrode along the first direction and superimposing on one end part of the semiconductor layer 4. The part of the second portion 5A-1 superimposing on the semiconductor layer 4 plays a role of a source for a thin film transistor. The other end part of the semiconductor layer 4 overlaps with one end part of the electrode 5B-1. The overlapped electrode 5B-1 serves as a drain for a thin film transistor. A second counter electrode 6 and a pixel electrode 7 are arranged on the top surface of the resulting structure on which the data electrode 5A is formed.

The second counter electrode 6 comprises a first portion 6a overlapping with the first counter electrode 2B-1 and perpendicularly intersecting with the data line, with elongating along the first direction; and a second portion comprising a plurality of branches 61, 62, 63, 64, 65, 69 each elongated along the second direction by a predetermined length. One 69 of the outer most branches 61, 69 is longer than the branches 62, 63, 64, 65 therebetween and the other outer most branch 61 is shorter than the branches 62, 63, 64, 65. Also, the second counter electrode 6 further comprises a third portion 6b elongated from one end of the longest branch 69 to the space between the shortest branch 61 and the adjacent branch 62, parallel to the first portion 6a. The first counter electrode 2B-1 is connected to he second counter electrode 6 via contact C, thus preventing signal delay of the counter electrode. On one hand, the pixel electrode 7 comprises a first portion 7a elongated alone the first direction between the third portion 6b of the second counter electrode 6 and the end part of the branches of the second counter electrode from a portion corresponding to one end of the third portion 6b of the second counter electrode to a portion corresponding to the other end of the third portion of the second counter; a second portion having a plurality of branches 71, 72, 73, 74, 75 which are separated from the branches of the second counter electrode, elongated from the first portion 7a towards the first portion 6a of the second counter electrode 6 along the second direction, so as to intersect with some part of the first counter electrode and to be inserted to spaces between the plurality of branches of the second counter electrode 6. The pixel electrode is connected to the drain 5B-1 of the thin film transistor via contact C1. The intersecting part of one end of the branch of the pixel electrode and the first counter electrode forms an auxiliary capacitor.

The width of the branches each of the second electrode 6 and the pixel electrode 7 is identical except the two outer most branches. The number of branches can be varied according to the unit pixel size. The ratio between the width of the branches of the first electrode and that of branches of the second electrode is preferred to be about 0.1 to 10. Also, the width of the branches of the first and second electrodes is preferred to be in the range of about 4 to 8 $\mu$m. The ratio between the width of the branches of the second electrode or first electrode and the distance from their respective neighboring branches of the first electrode or second electrode is preferred to be about 0.1 to 2.

A method for manufacturing a liquid crystal display according to the present invention is given below.

A gate line 2A and a first counter electrode 2B-1 are formed by depositing one selected from a group consisting of aluminum, titanium, tantalum, and chrome and combination thereof and patterning the same as illustrated in FIG. 4. Next, a gate insulation film 3 is deposited over the resulting structure to provide insulation from the metal wires which will be formed in a later process. The gate insulation film 3 is either made of double-layered insulation layer or by anode oxidizing the metal used for the gate line or first counter electrode. Next, a semiconductor layer 4 is formed on a predetermined part of the second portion 21 of the gate line by depositing amorphous silicon on top of the gate insulation film 3. Afterwards, by depositing one selected from a group consisting of aluminum, titanium, tantalum and chrome and combination thereof and patterning the same, thereby to overlap with one end of the semiconductor layer 4, a data line 5A including a region serving as a source electrode 5A-1 of a thin film transistor and a drain electrode 5B-1 overlapping with the other end of the semiconductor layer 4, are formed.

Next, a protective film 31 is deposited over the resulting structure. Afterwards, the protective film 31 or/and the gate insulation film 3 is/are etched so as to form contacts C, C1 exposing a predetermined part of the drain electrode 5B-1 and the first counter electrode 2B-1. After depositing a transparent metal material such as ITO to a predetermined thickness, a pixel electrode 7 and a second counter electrode 6 are formed as illustrated in FIG. 4.

Figure 6:
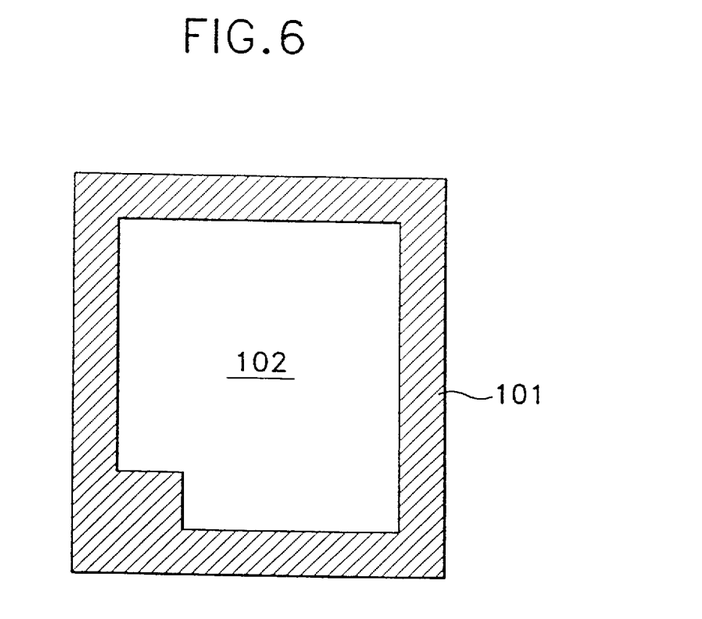
FIG. 6 is a planar view of an upper substrate that is to be combined with a lower substrate.

As illustrated in FIG. 6, back matrix (101) is formed on a part of surface of upper substrate which faces the lower substrate 1, the part of the surface of upper substrate corresponding to an area defined by data line 5A and gate line 2A, the defined area excluding the branches 61, 62, 63, 64, 65 and the third portion 6b of the second counter electrode 6 and a space defined by the first counter electrode 2B-1 and the branches 71, 72, 73, 74, 75 of the pixel electrode 7. A color filters 102 surrounds the black matrix 101.

After necessary electrode and color filters are formed on the upper and lower substrates, the two substrates are combined. Inside the space formed by the two substrates, a liquid crystal material having negative dielectric anisotropy, a mobile viscosity of about 1 to 100 cp at room temperature, and a slanting angle of 22° with respect to the horizontal axis of liquid crystal molecules, is injected and sealed.

As described above, the plurality of branches of the second counter electrode and the pixel electrode are arranged in turns forming a delicate pattern. More specifically, since the distance between the branches is considerably small, electric field formed at the edge of the branch pattern is not a parabolic field but a linear field parallel to the lower substrate. Also, since the speed of the liquid crystal molecules arranged along the electric field of the pixel electrode and the counter electrode is increased, the response speed of the liquid crystal is increased. These effects are apparent in FIG. 7. Also, since the pixel electrode and the second counter electrode are of transparent metal materials, the transmittance and the aperture rate are considerably enhanced.

Figure 7:
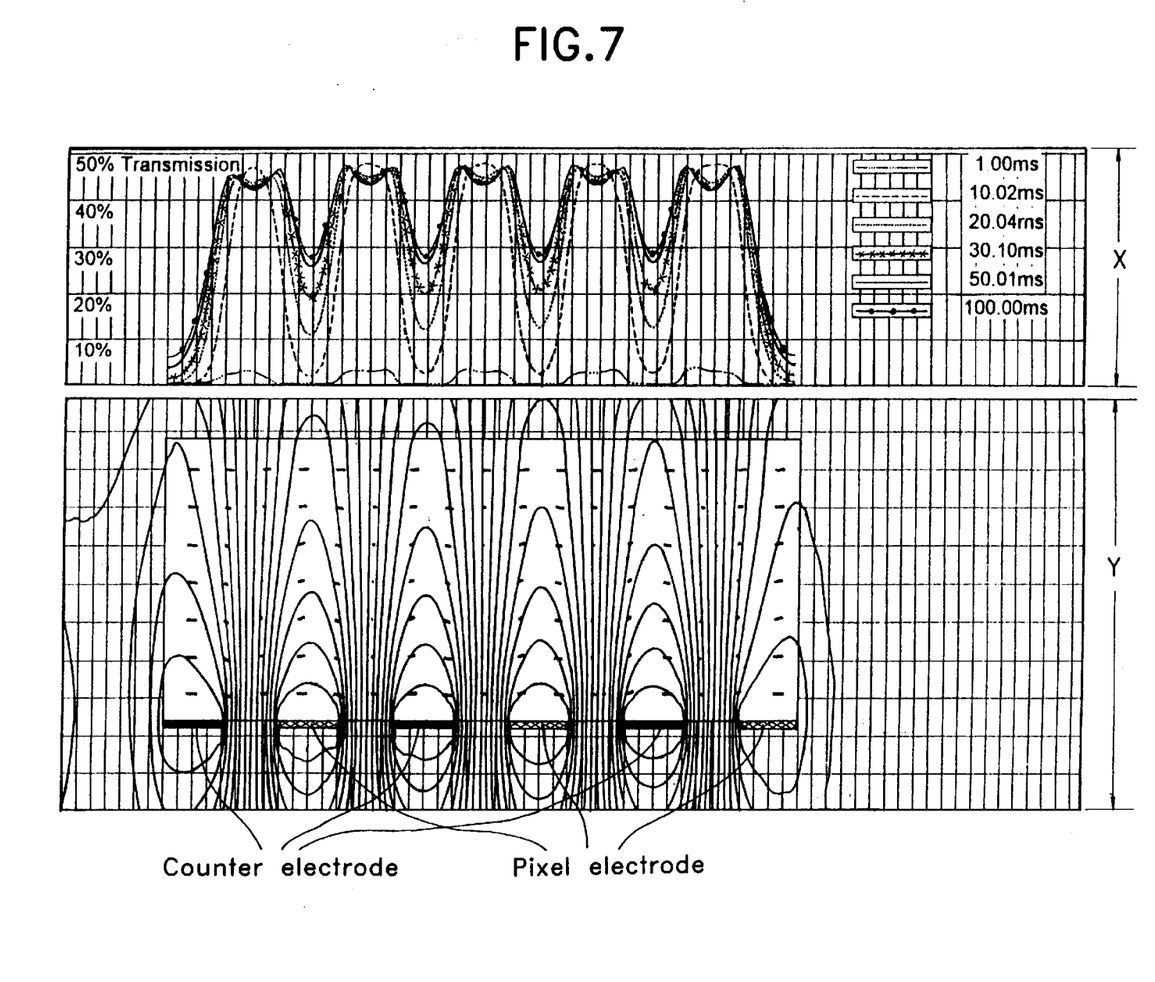
FIG. 7 is a view illustrating the transmittance of a liquid crystal display according to the present invention when voltage is introduced to the same.

FIG. 7 is a view showing the transmittance and the response speed when voltage is introduced to a liquid crystal display device according to the present invention. Y is height of the liquid crystal layer from the lower substrate 1 with pixel electrode and the counter electrode. X stands for the transmittance in accordance with the response speed when voltage is applied. The transmittance reads 40% or more after 50 ms from applying the voltage to the liquid crystal display. Hence, it is apparent that the liquid crystal display device according to the present invention has increased response speed compared to the conventional liquid crystal display device.

What is claimed is:

1. A liquid crystal display device comprising:
    gate line elongated along a first direction;
    a data line elongated along a second direction substantially perpendicular to said first direction, and intersecting with said gate line over said gate line;
    a first electrode of transparent metal material and formed over said data line, comprising:
        a first portion elongated over said data line along said first direction and perpendicularly intersecting with said data line;
        a second portion comprising a plurality of branches each elongated along said second direction starting from said first portion of said first electrode toward said gate line, wherein one of two outer most branches is longer than branches between the two outer most branches, and the other outer most branch is shorter than branches between the two outer most branches; and
        a third portion separated by a predetermined distance along said second direction with said gate line, and elongated along said first direction starting from said longest branch to a space formed between said shortest branch and its closest branch; and
    a second electrode of transparent metal material, formed on the same plane as said first electrode, said second electrode comprising:
        a first portion elongated along said first direction between said third portion of said first electrode and the end parts of said branches of said second portion of said first electrode from a portion corresponding to one end of the third portion of the first electrode to a portion corresponding to the other end of said third portion of said first electrode; and
        a second portion comprising a plurality of branches each separated from said plurality of branches each of said first electrode by a predetermined distance, in which said second portion of second electrode is elongated along said second direction starting from said first portion of said second electrode to the space between said branches of said second portion of said first electrode.

2. The liquid crystal device as claimed in claim 1, wherein one of said first electrode and said second electrode is a counter electrode and the other is a pixel electrode.

3. The liquid crystal display device claimed in claim 1, wherein the width ratio of the branches of said first electrode and said second electrode is in the range of about 0.1 to 10.

4. The liquid crystal display device claimed in claim 1, wherein the width of both of the branches of said first electrode and said second electrode is in the range of about 4 to 8 µm.

5. The liquid crystal display device claimed in claim 1, wherein the ratio of the width of the branches of said second or first electrode and the distance between adjacent branches of said first or second electrode is in the range of about 0.1 to 2.

6. The liquid crystal display device claimed in claim 1, wherein said first and second Electrodes are of ITO.

7. The liquid crystal display device claimed in claim 1, further comprising a third electrode formed on the same plane as said gate line, elongated along said first direction so as to overlap with end parts of branches of said second electrode.

8. The liquid crystal display device claimed in claim 7, wherein said first electrode and said third electrode are connected by a contact.

9. The liquid crystal display device claimed in claim 8, wherein said first electrode arid said third electrode are a first counter electrode and a second counter electrode respectively, and said second electrode is a pixel electrode.

10. The liquid crystal display device claimed in claim 7, wherein said first electrode and said third electrode are a first counter electrode and a second counter electrode respectively, and said second electrode is a pixel electrode.

11. The liquid crystal display device claimed in claim 7, further comprising a substrate equipped with a black matrix facing the domain defined by said data line and said gate line, said domain excluding a space defined by said third electrode and said branches of said second electrode, said branches of said first electrode and said third portion of said first electrode.

12. The liquid crystal display device claimed in claim 1 further comprising a thin film transistor formed at a space between said shortest branch of said first electrode and said gate line.

13. The liquid crystal display device claimed in claim 12, wherein said thin film transistor is connected to said data line, said gate line, and said shortest branch of said first electrode.

14. The liquid crystal display device claimed in claim 13, wherein one of said first electrode and said second electrode is a counter electrode and the other is a pixel electrode.

15. a liquid crystal display device comprising:

a substrate;

a gate line formed on the top surface of said substrate, said gate line comprising a first portion elongated along a first direction, and a second portion protruded from said first portion by a predetermined length along a second direction which is perpendicular to said first direction;

a first electrode formed on the same plane as said gate line, separated along said second direction from said first portion of said gate line by a predetermined distance, elongated to said first direction;

a gate insulation film formed on the resulting structure on which said gate line and said first electrode are formed;

a semiconductor layer formed on top of said gate insulation film beneath which said second portion of said gate line is formed;

a data line comprising a first portion intersecting with said first portion of said gate line under said gate insulation film, and a second portion protracting from said first portion of said data line and overlapping with a predetermined part of one end of said semiconductor layer;

a second electrode where one end of said second electrode overlaps with a predetermined part of the other end of said semiconductor layer;

a protective layer formed on top of the resulting structure on which said data line and said first electrode are formed, equipped with contact holes that expose a predetermined part of said first electrode and a predetermined part of said second electrode;

a third electrode of a transparent metal material, formed on top of the resulting structure on said protective layer is formed, said third electrode comprising:

a first portion elongated along said first direction over said data line and perpendicularly intersecting with said first portion of said data line;

a second portion comprising a plurality of branches elongated along said second direction starting from said first portion of said third electrode toward said gate line, wherein one of the outer most branches is longer than the branches between the two outer most branches, and the other outer most branch is shorter than said branches between the two outer most branches; and a third portion separated by a predetermined distance along said second direction with said gate line, and elongated along said first direction starting from said longest branch to the space formed between said shortest branch and its closest branch; and a fourth electrode of a transparent metal material, formed on the same plane as said third electrode, said fourth electrode comprising:

a first portion elongated along said first direction between said third portion of said third electrode and the end part of said branches of said second portion of said third electrode from a portion corresponding to one end of said third portion of said third electrode to a portion corresponding to the other end of said third portion of said third electrode; and a second portion comprising a plurality of branches each separated with said plurality of branches each of said third electrode by a predetermined distance, in which said branches each of second portion of said fourth electrode is elongated along said second direction starting from said first portion of said fourth electrode to the space between said branches of said second portion of said third electrode.

16. The liquid crystal display device claimed in claim 15, wherein said first and third electrodes are a first and second electrodes respectively, and said fourth electrode is a pixel electrode.

17. The liquid crystal display device claimed in claim 15, wherein said second electrode is a drain of a thin film transistor, said second portion of said gate line is a gate of said thin film transistor, said semiconductor layer is a channel of the same, and said second portion of said data line is a source of the same.

18. A method of manufacturing a liquid crystal display having a gate line elongated along a first direction and a data line elongated along a second direction practically perpendicular to the first direction and intersecting with the gate line, said method comprising the step of: simultaneously forming a first electrode and a second electrode over said date line, said first electrode of transparent metal material comprising:

a first portion elongated over said data line along said first direction and perpendicularly intersecting with said data line;

a second portion comprising a plurality of branches each elongated along said second direction starting from said first portion of said first electrode toward said gate line, wherein one of the two outer most branches is longer than branches between the two outer most branches, and the other outer most branch is shorter than the branches between the two outermost branches; and a third portion separated by a predetermined distance along said second direction with said gate line, and elongated along said first direction starting from said longest branch to the space formed between said shortest branch and its closet branch;

said second electrode of transparent metal material, formed on same plane as said first electrode, said second electrode comprising:

a first portion Elongated along said first direction between said third portion of said first electrode and the end part of said branches of said second portion of said first electrode from a portion corresponding to one end of the third portion of the first electrode to a portion corresponding to the other end of said third portion of said first electrode; and a second portion comprising a plurality of branches each separated with said plurality of branches each of said first electrode by a predetermined distance, in which said second portion of said second electrode is elongated along said second direction starting from said first portion of said second electrode to the space between said branches of said second portion of said first electrode.

19. The method of manufacturing a liquid crystal device as claimed in claim 18, wherein one of said first electrode and said pixel electrode is a counter electrode and the other is a pixel electrode.

20. The method of manufacturing a liquid crystal device as claimed in claim 18, further comprising the step of forming a third electrode elongated along said first direction so as to overlap with end parts of branches of said second electrode, during said gate line formation.

21. The method of manufacturing a liquid crystal device as claimed in claim 18, after said step of manufacturing third electrode, further comprising the steps of:

successively forming a insulation layer and a protective layer on top of the resulting structure on which said third electrode formed is formed; and etching a predetermined part of said insulation layer and protective layer to form contact holes so as to connect said first electrode and said third electrode.

22. The method of manufacturing a liquid crystal device as claimed in claim 18, wherein said first and said third electrode is a first and a second electrode respectively, and said second electrode is a pixel electrode.

23. The method of manufacturing a liquid crystal device as claimed in claim 18, wherein the ratio of the width of the branches of said first electrode and said second electrode is in the range of about 0.1 to 10.

24. The method of manufacturing a liquid crystal device as claimed in claim 18, wherein the width of the branches each of said first and second electrodes is in a range of about 4 to 8 $\mu$m.

25. The method of manufacturing a liquid crystal device as claimed in claim 18, wherein the ratio of the branch width of said second or said first electrode and the distance to their adjacent branch of first or second electrode is in a range of about 0.1 to 2.

26. The method of manufacturing a liquid crystal device as claimed in claim 18, wherein said first and second electrodes are of ITO.

27. A method of manufacturing a liquid crystal display device comprising the steps of:

providing a substrate;

forming simultaneously both a gate line and a first electrode on top surface of said substrate, said gate line comprising:

a first portion elongated along a first direction of said gate line, and a second portion protruded from said first portion by a predetermined length along a second direction which is perpendicular to said first direction, and said first electrode being separated along said second direction from said first portion of said gate line of said gate line by a predetermined distance and elongated to said first direction;

forming a gate insulation film on the resulting structure on which said gate line and said first electrode are formed;

forming a semiconductor layer on top of a predetermined part of said gate insulation film where said second portion of said gate line is formed;

forming simultaneously a data line and a second electrode, said data line comprising:

a first portion intersecting with said first portion of said gate Line by way of said gate insulation film; and a second portion protracting from said first portion of said data line and overlapping with a predetermined part of one end of said semiconductor layer, and said second electrode where one of its end overlaps with a predetermined part of the other end of said semiconductor layer;

forming a protective film on the resulting structure on which said data line and second electrode are formed;

etching said protective film formed on said second electrode, and said protective film and said gate insulation layer formed on said first electrode to expose a predetermined part of said second electrode and a predetermined portion of said first electrode; and forming simultaneously a third electrode and a fourth electrode, said third electrode of transparent metal material comprising:

a first portion elongated on said data line along said first direction and perpendicularly intersecting with said data line;

a second portion comprising a plurality of branches elongated along said second direction starting from said first portion of said third electrode toward said gate line, wherein one of the two outer most branches is longer than the branches in the two outer most branches, and the other outer most branch is shorter than the branches in the two outermost branches; and a third portion separated by a predetermined distance along said second direction with said gate line and elongated along said first direction starting from said longest branch to the space formed between said shortest branch and its closest branch, and said fourth electrode of transparent metal material, formed on the same plane as said third electrode, said fourth electrode comprising:

a first portion elongated along said first direction between said third portion of said third electrode and the end part of said branches of said second portion of said third electrode from a portion corresponding to one end of the third portion of said third electrode to a portion corresponding to the other end of said third portion of said third electrode; and a second portion comprising a plurality of branches each separated with said plurality of branches each of said third electrode by a predetermined distance, in which said second portion of said fourth electrode is elongated along said second direction starting from said first portion of said fourth electrode to the space between said branches of said second portion of said third electrode.

28. The method of manufacturing a liquid crystal device as claimed in claim 27, wherein said first and third electrodes are first and second counter electrodes respectively, and said fourth electrode is a pixel electrode.

29. The method of manufacturing a liquid crystal device as claimed in claim 27, wherein said second electrode is a drain of a thin film transistor, said second portion of said gate line is a gate of said thin film transistor, said semiconductor layer is a channel of the same, and said second portion of said data line is a source of the same.

30. The method of manufacturing a liquid crystal device as claimed in claim 27, wherein said third and fourth electrodes are of ITO.

31. The method of manufacturing a liquid crystal device as claimed in claim 30, wherein said data line and said second electrode acre made of one selected from a group consisting of aluminum, titanium, tantalum, or chrome and combination thereof.

32. The method of manufacturing a liquid crystal device as claimed in claim 27, wherein sa d data line and said second electrode are made of one selected from a group consisting aluminum, titanium, tantalum, or chrome and combination thereof.

33. The method of manufacturing a liquid crystal device as claimed in claim 27, wherein said gate insulation film is formed by oxidizing the metal used to form said data line and said second electrode.

* * * * *

UNITED STATES PATENT AND TRADEMARK OFFICE
CERTIFICATE OF CORRECTION

PATENT NO. : 5,886,762
DATED : March 23, 1999
INVENTOR(S) : Lee et al

Page 1 of 2

It is certified that error appears in the above-identified patent and that said Letters Patent is hereby corrected as shown below:

At col. 1, line 53, please cancel "Line" and substitute --line-- therefor.

At col. 3, line 45, please cancel "vise versa" and substitute --vice versa-- therefor.

At col. 5, line 43, please cancel "vise versa" and substitute --vice versa-- therefor; and
at line 64, please cancel "gale" and substitute --gate-- therefor.

At col. 8, line 9, please cancel "to he" and substitute --to the-- therefor.

At col. 9, line 6, please cancel "back" and substitute --black-- therefor; and
at line 16, please cancel "electrode" and substitute --electrodes-- therefor.

At col. 10, line 40 (claim 6, line 2), please cancel "Electrodes" and substitute --electrodes-- therefor; and
at line 50 (claim 9, line 2), please cancel "arid" and substitute --and-- therefor.

UNITED STATES PATENT AND TRADEMARK OFFICE
CERTIFICATE OF CORRECTION

PATENT NO. : 5,886,762
DATED : March 23, 1999
INVENTOR(S) : Lee et al

It is certified that error appears in the above-identified patent and that said Letters Patent is hereby corrected as shown below:

At col. 11, line 8 (claim 15, line 1), please capitalize "a".

At col. 12, line 46 (claim 18, line 28), please cancel "Elongated" and substitute --elongated-- therefor.

At col. 13, line 56 (claim 27, line 24), please cancel "Line" and substitute --line-- therefor.

At col. 14, line 54 (claim 31, line 3), please cancel "acre" and substitute --are-- therefor; and at line 58 (claim 32, line 2), please cancel "sa d" and substitute --said-- therefor, Signed and Sealed this Fourteenth Day of September, 1999

Attest:

Q. TODD DICKINSON

*Attesting Officer*     *Acting Commissioner of Patents and Trademarks*